United States Patent
Compton et al.

(10) Patent No.: US 10,684,844 B2
(45) Date of Patent: Jun. 16, 2020

(54) MAKING AND USING FUNCTIONAL EXPLOITATION INFORMATION IN PERFORMING SOFTWARE OR FIRMWARE UPDATES

(71) Applicant: International Business Machines Corporation, Armonk, NY (US)

(72) Inventors: Scott B. Compton, Hyde Park, NY (US); William J. Rooney, Hopewell Junction, NY (US); Dale F. Riedy, Poughkeepsie, NY (US); Barbara J. Bryant, Clinton Corners, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/827,042

(22) Filed: Nov. 30, 2017

(65) Prior Publication Data
US 2019/0163464 A1     May 30, 2019

(51) Int. Cl.
*G06F 9/445*     (2018.01)
*G06F 8/65*     (2018.01)
*G06F 8/61*     (2018.01)

(52) U.S. Cl.
CPC .................. *G06F 8/65* (2013.01); *G06F 8/64* (2013.01); *G06F 9/44536* (2013.01); *G06F 8/61* (2013.01)

(58) Field of Classification Search
CPC .......... G06F 8/64; G06F 8/65; G06F 9/44536; G06F 9/45541; G06F 11/203; G06F 8/61
USPC ........................................................ 717/173
See application file for complete search history.

(56) References Cited

U.S. PATENT DOCUMENTS

| 8,370,862 | B1 | 2/2013 | Joyce |
| 8,856,774 | B1 * | 10/2014 | Kulaga et al. ............ G06F 8/65 |
| | | | 717/168 |
| 9,201,637 | B1 | 12/2015 | Kvinge |
| 9,229,703 | B1 | 1/2016 | Hamer |

(Continued)

FOREIGN PATENT DOCUMENTS

CN     101499114 A     8/2009

OTHER PUBLICATIONS

Felt et al., "The Effectiveness of Application Permissions", In Proc. of the USENIX Conference on Web Application Development, 2011, 12 pages.

(Continued)

*Primary Examiner* — Wei Y Zhen
*Assistant Examiner* — Mohammed N Huda
(74) *Attorney, Agent, or Firm* — Andrew Aubert

(57) ABSTRACT

A methodology for creating and using information identifying what and how software and/or firmware modules are used in computer systems, called functional exploitation data. The functional exploitation data can be used to identify what modules should be updated and how updates should be implemented. The functional exploitation data can also be used to identify other computer systems as candidates for updates based on similarity to computer systems that have reported problems, and propose implementing similar updates on the candidates. Functional exploitation data can also be used to identify under-utilized modules for enhancements or greater advocacy. The functional exploitation data can be implemented in the form of a concatenated string.

15 Claims, 10 Drawing Sheets

(56) References Cited

U.S. PATENT DOCUMENTS

| | | |
|---|---|---|
| 9,280,338 B1 | 3/2016 | Stickle |
| 2006/0080656 A1* | 4/2006 | Cain et al. ............... G06F 8/65 717/174 |
| 2016/0196132 A1* | 7/2016 | Searle et al. ............. G06F 8/65 717/173 |
| 2019/0129701 A1* | 5/2019 | Hawrylo et al. .......... G06F 8/65 |

OTHER PUBLICATIONS

IBM, "Using Public Key Certificates to Ensure Subsystem Component Level Compatibility", An IP.com Prior Art Database Technical Disclosure, Original Publication Date: Mar. 1, 2000 IP.com No. IPCOM000014639D, IP.com Electronic Publication Date: Jun. 20, 2003, 4 pages.

* cited by examiner

YOU HAVE RECEIVED A FIRMWARE PATCH RELATING TO BLUETOOTH. BECAUSE YOU HAVE ONLY FUNCTIONALLY EXPLOITED BLUETOOTH FOUR TIMES IN THE PAST YEAR. THEREFORE, INSTALLATION OF THIS IS YOUR CHOICE. DO YOU WANT TO INSTALL THE BLUE TOOTH FIRMWARE PATCH?   Y

MAKING AND USING FUNCTIONAL EXPLOITATION INFORMATION IN PERFORMING SOFTWARE OR FIRMWARE UPDATES

BACKGROUND

The present invention relates generally to the field of providing information technology (IT) services, and more particularly to IT services related to setting up and maintaining computer systems including software, firmware and/or hardware components.

It is known to automatically trigger a firmware update when the functional exploitation of a computer resource causes operational problems. For example, US published patent application 2006/0075276 "Kataria" describes monitoring and updating firmware over a network, including monitoring computer systems for firmware problems such as corrupted data and/or hung-up operations and whether the computer systems require automatic updates. Kataria also describes the monitored computer system requesting a firmware update over a network. Kataria further describes including a controller in the computer system with the capability to determine whether the firmware is experiencing corruption or hang-up problems and request a firmware update over a network.

There exist tools for monitoring execution of which code lines were executed. It is known to use a tool for communicating which lines of code were executed for debugging purposes.

SUMMARY

According to an aspect of the present invention, there is a method, computer program product and/or system that performs the following operations (not necessarily in the following order): (i) receiving a functional exploitation data set, where the functional exploitation data set includes information indicative of usage of a plurality of software, hardware and/or firmware components for a target computer system; (ii) selecting, by machine logic, a selected update installation procedure for determining whether to install and/or installing a first software/firmware update on the target computer system; and (iii) sending, to the target computer system, a first software/firmware update data set according to the selected update procedure.

According to an aspect of the present invention, there is a method, computer program product and/or system that performs the following operations (not necessarily in the following order): (i) collecting, by a target computer system, functional exploitation data corresponding to usage of a plurality of software, hardware and/or firmware components for a target computer system; (ii) assembling the functional exploitation data into a functional exploitation signature (FES) having a predetermined format and order; (iii) sending, by the target computer system through a communication network and to an update server, the FES; and (iv) receiving, by the target computer through the communication network and from the update server, an update data set.

According to an aspect of the present invention, there is a method, computer program product and/or system that performs the following operations (not necessarily in the following order): (i) receiving a functional exploitation data set, where the functional exploitation data set includes information indicative of usage of a plurality of software, hardware and/or firmware components for a target computer system; (ii) receiving a plurality of software/firmware update data sets, where each software/firmware update data set includes a respective software/firmware update for the target computer system; (iii) selecting, by machine logic, a first software/firmware update data set from the plurality of software/firmware update data sets based, at least in part, on the functional exploitation data set; and (iv) sending, to the user's computer system, the first software/firmware update data set.

BRIEF DESCRIPTION OF THE DRAWINGS

FIG. 4 is a screenshot view generated by the first embodiment system;

DETAILED DESCRIPTION

Figure 1:
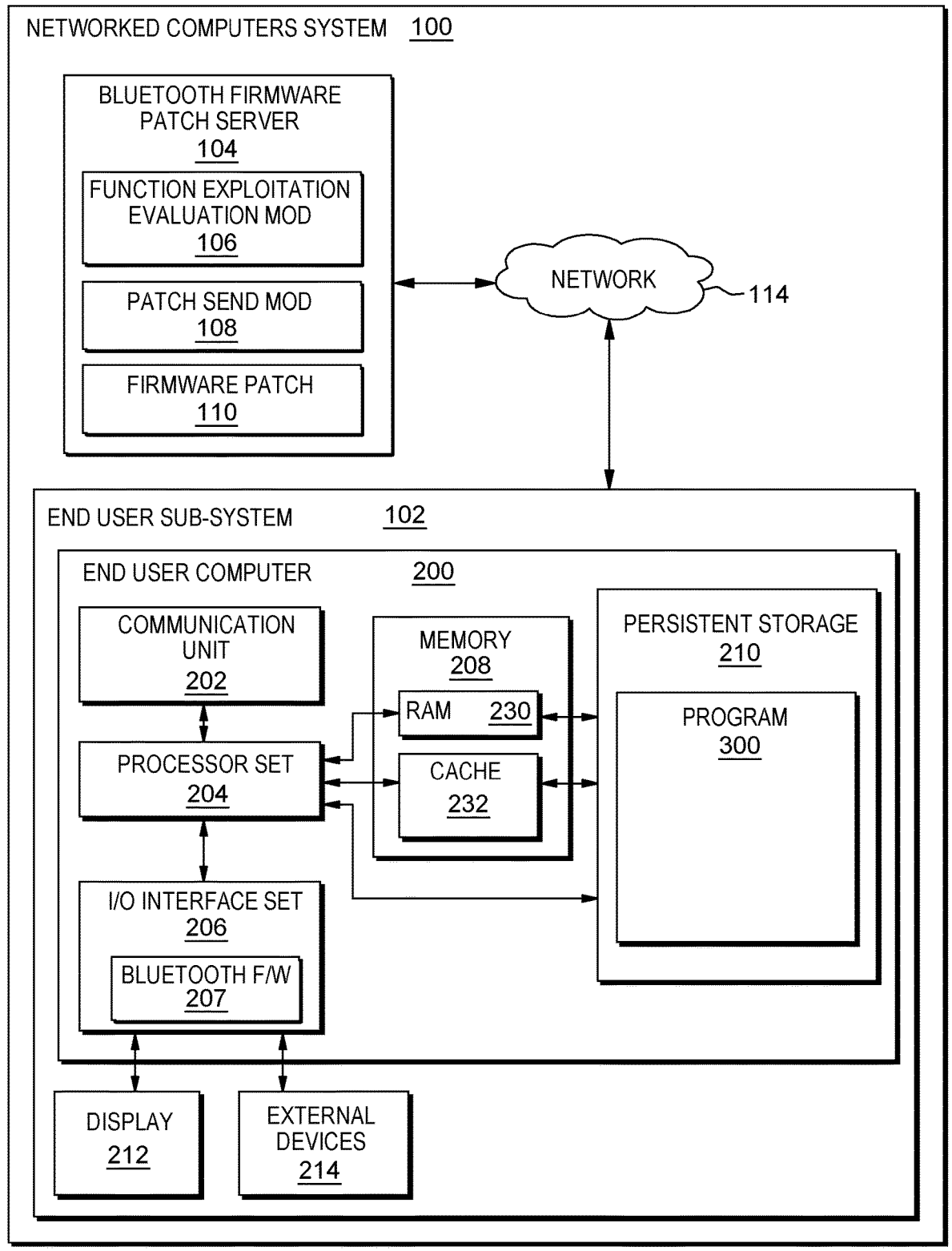
FIG. 1 is a block diagram view of a first embodiment of a system according to the present invention.

Some embodiments of the present invention are directed to methods and systems for generating functional exploitation signatures and/or using the same in the provision of IT services. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: end user sub-system 102; Bluetooth firmware patch server 104; functional exploitation mod 106; patch send mod 108; firmware patch 110; communication network 114; end user computer 200; communication unit 202; processor set 204; input/output (I/O) interface set 206; Bluetooth k/w 207; memory device 208; persistent storage device 210; display device 212; external device set 214; random access memory (RAM) devices 230; cache memory device 232; and program 300.

End user sub-system 102 is, in many respects, representative of the various computer sub-system(s) in the present invention. Accordingly, several portions of end user sub-system 102 will now be discussed in the following paragraphs.

End user sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

End user sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

End user sub-system 102 is shown as a block diagram with many double arrows. These double arrows (no separate reference numerals) represent a communications fabric, which provides communications between various components of end user sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for end user sub-system 102; and/or (ii) devices external to end user sub-system 102 may be able to provide memory for end user sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to end user sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Bluetooth k/w 207 allows for Bluetooth communications with other Bluetooth enabled devices, such as smartphones, wireless audio headphones, wireless input devices (keyboards, computer mice) and wireless microphones. Bluetooth communications are a form of wireless digital communication capable of exchanging data over short differences.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
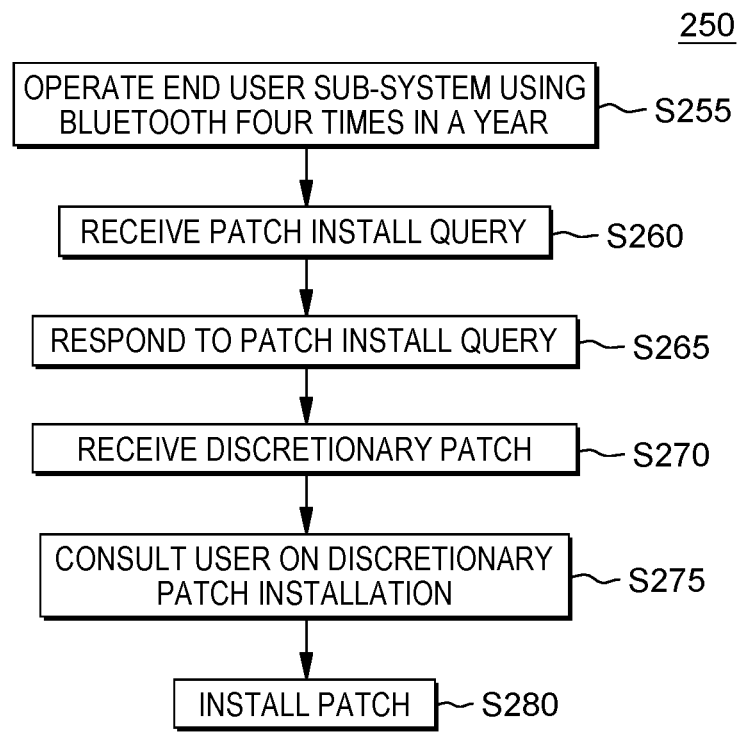
FIG. 2 is a flowchart showing a first embodiment method performed, at least in part, by the first embodiment system.
Figure 3:
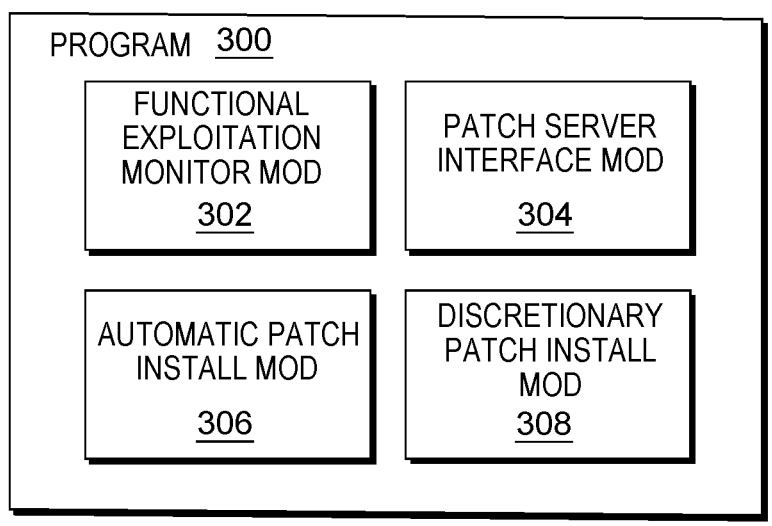
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255 where an end user operates end user sub-system 102 (see FIG. 1) to do miscellaneous work related personal computing over the course of a year. During this year of computer operations, the end user only uses the Bluetooth connection functionality, controlled by Bluetooth firmware 207, on four (4) occasions. While this indicates some usage of the Bluetooth functionality, it is much less frequent usage than that for other similarly-situated users who use Bluetooth. During this year, the company that provides the Bluetooth firmware discovers and improvement that will slightly reduce the amount of times that a Bluetooth connection is dropped. It is noted that the user of sub-system 102 has never experienced a dropped connection—in this example, the problem of dropped connection is rare even for heavy users of the Bluetooth functionality.

During the year of operations of operation S255, functional exploitation monitor module ("mod") 302 monitors the functional exploitation of the Bluetooth functionality and stores a Bluetooth functional exploitation value of four (4) because there have been four (4) Bluetooth pairings made with end user computer 200 over the past year. In this embodiment, the functional exploitation information monitored relates to hardware usage. Alternatively, software and/or firmware usage may also be monitored as functional exploitation.

Processing proceeds to operation S260, where Bluetooth firmware patch server 104 (see FIG. 1) sends, over communication network 114, to patch server interface mod 304 of program 300 of end user sub-system 102 a request to install firmware patch 110. Firmware patch 110 implements the discovered improvement that causes a slight reduction in the issue of dropped Bluetooth connections. The request is not displayed to the end user of end user sub-system 102 at this point.

Instead, processing proceeds to operation S265, where mod 304 responds, over communication network 114 and to functional exploitation evaluation mod 106 of Bluetooth firmware patch server 104 (see FIG. 1) with the Bluetooth functional exploitation information, that is, that the Bluetooth functionality has only been functionally exploited four times over the past year. In this example, it is possible that the firmware patch will somewhat help in operations of end user sub-system 102, but the improvement is likely to be obtained infrequently, if at all.

It is important to note that it is a form of "functional exploitation" information that is being communicated here, and not a problem, bug, malfunction or glitch related information. As the term "functional exploitation" ("FE") is used herein, problem, bug, malfunction or glitch related information is not functional exploitation information because function exploitation information relates to the fact of normal, non-problematic operation of a computer component (in this example, Bluetooth hardware and firmware) usage and/or the degree of normal, non-problematic usage (for example, amount of data stored in a storage device, amount of time that a software program actively runs, etc.). In this embodiment, the FE information relates entirely to hardware and firmware used to operate hardware. Alternatively, some embodiments may: (i) also include software exploitation information; or (ii) include only software exploitation information.

In this embodiment, only one type of FE information is sent to the software update server. Alternatively, multiple items of FE information could be sent. As explained in more detail in the following sub-section of this Detailed Description section, in some embodiments, different pieces of FE information are concatenated into a Functional Exploitation Signature (FES). In some embodiments, the software update server may receive and consider both FE information and malfunction related information in deciding whether and/or how to deliver a software, or firmware, update.

Processing proceeds to operation S270, where: (i) machine logic of FE evaluation mod 106 decides to deliver firmware patch 110 to end user sub-system 102 as a discretionary update based on the FE information received from end user sub-system 102; (ii) patch send mod 308 sends firmware patch 110 out, as a discretionary update, over communication network 114 and to end user sub-system 102; and (iii) discretionary patch install mod 308 receives firmware patch 110. Note that choosing an appropriate hardware, software and/or firmware update and/or choosing an appropriate manner of delivering the update is different than debugging programming code (that is, designing a new update).

More specifically with respect to sub-operation (i) of operation S270 identified in the preceding paragraph, in this example, FE evaluation mod 106 is programmed to: (a) if the Bluetooth FE value indicates ten (10), or more, uses of Bluetooth in the past year, then deliver the patch to automatic patch install mod 306 as an automatic update; (b) if the Bluetooth FE value indicates zero (0) uses of Bluetooth in the past year, then do not deliver the patch at all; and (c) if the Bluetooth FE value indicates one (1) to nine (9) uses of Bluetooth in the past year, then it delivers the patch as a discretionary update.

To state one of the concepts underlying the machine logic described in the preceding paragraph in more general terms, the manner of delivering the software, or firmware update is based, at least in part, upon at least one piece of FE information. In this embodiment, it is the update server that applies this machine logic that makes a determination based on the FE information. Alternatively, other computers could apply this type of machine logic (for example, it could be implemented in end user computer 102.

In this embodiment, there were basically three priority levels that could have been associated with the update: (i) automatic; (ii) discretionary; and (iii) do not deliver. There could be more, or fewer, levels of update priority. Also, the priority can be expressed in other ways. For example, the priority value may simply be expressed as a criticality level (for example, number, color) associated with an update that is delivered as an update that is discretionary on the part of the end user or system administrator. Under this alternative, the FE information still is considered in the manner in which the update is delivered.

In this embodiment, the exact same firmware patch 110 is delivered, regardless of the FE information. Alternatively, different patches could be delivered depending upon the FE values considered by the machine logic of mod 106. This alternative would be another example where the manner of delivering an update is based, at least in part, upon piece(s) of FE information.

In this embodiment, the machine logic that considers the FE information in deciding the manner of delivery of the software/firmware update is built into the server sub-system that serves the update itself out to various, remote end user devices. Alternatively, the consideration of the FE information, and the consequent impact of the FE information on the manner of delivering the software/firmware update, could be performed by machine logic residing at the update target machine (or potential target machine, in this example end user computer 200).

Processing proceeds to operation S275, where discretionary patch mod 308 consults the user to determine whether the user wants to install the patch. Again, this is because the FE level of the Bluetooth functionality caused the patch installation to be discretionary, rather than automatic or non-existent in this example. As shown in screenshot 400 of FIG. 4, the user has agreed to installation of firmware patch 110.

Processing proceeds to operation S280, where mod 308 installs firmware patch 110 on Bluetooth firmware 207, in response to the user's agreement to such installation. Going forward, functional exploitation monitor mod 302 will continue monitoring Bluetooth normal operations so that up-to-date FE information is always available for use in determining a manner of delivering and/or applying future patches to Bluetooth firmware 207.

III. Further Comments and/or Embodiments

In today's Information Technology (IT) environment, it can be somewhat impossible to keep track of all of the functions that a customer's IT environment exploits. Personnel that manage the IT environment are typically responsible for procuring and deploying new technology and updates (maintenance) for hardware and software. The IT personnel often do not understand the specific operations of the solutions deployed in all of the applications (for example, they may know that certain middleware, such as a certain database server product, is used by an application, but have no specific knowledge of the subtleties of execution within that middleware). They may also be using vendor packages that exploit functions that are provided by other program providers, so their environment may be exploiting these functions (unbeknownst to the personnel).

Some embodiments of the present invention may recognize one, or more, of the following facts, potential problems and/or potential areas for improvement with respect to the current state of the art: (i) the volume of updates alone is staggering and must be manually inspected to determine if the update affects the operating IT environment; (ii) this is counter to a typical customer's desire to limit changes that could adversely affect the day to day working IT operation; (iii) often, the personnel must make a decision on whether to install updates that may or may not be critical to their operating environment based on limited understanding of what the updates correct, often applying updates that are not specifically necessary, or not applying updates that affect critical operations that may be exposed to a particular problem; (iv) IT environments are often operating 24 hours a day, seven days a week, 365 days a year in nature, and applying updates may cause the need to restart applications or systems, thus causing down time; and/or (v) moreover, companies often have no way of knowing what a particular client exploits in their IT environment.

Some embodiments of the present invention may recognize one, or more, the following facts, potential problems and/or potential areas for improvement with respect to the current state of the art: (i) large enterprise IT companies ship a massive variety of functions in all operating environments (including hardware and software), and typically without verbal acknowledgement of what is used, the enterprise IT companies can be blind to the exploitation until a problem arises with a particular technology and the problem is reported, diagnosed, and remediated; (ii) while some commercial solutions do have some call-home data for some of the technology delivered, it is somewhat limited by design in order to protect client sensitive information; (iii) couple the lack of available exploitation information with a desire by companies to provide timely and accurate problem diagnosis and remediation, much of the problem diagnosis is hands on by skilled personnel by both clients and function owners; (iv) this elongates the diagnosis to remediation window; and (v) some technology exists and may help provide some infrastructure (a Core Registry for a 64-bit operating system for mainframes).

Some embodiments of the present invention may include one, or more, of the following features, characteristics and/or advantages: (i) provide named functional exploitation signature (FES) services, allowing components, program products and any software on the system obtain and modify the FES as they see fit; (ii) after systems execute for periods of time, the individual FESes become signatures of what functionality has been used on the system; (iii) updates and new development shipments, when made available, are created with appropriate "FES update directives" for areas of processing affected by the changes made in development and service; and/or (iv) instead of asking the system programmers whether a particular piece of update needs to be applied, the Fix/Update Manager Program 510 (such as SMP/E in the z/OS operating system) can retrieve the FES signatures (identified in the FES update directives) on the target systems and compare against the FES update directives for the changes to be applied, and effectively make the determination programmatically. FES update directives contain information so that the Fix/Update Manager Program 510 can understand how to interpret the FES data.

Some embodiments of the present invention may include one, or more, of the following features, characteristics and/or advantages: (i) the FES can help the IT personnel understand what regression testing is required for the update that is being installed (this may force the product owner that employs the FES technology to externalize the definition of the FES information, allowing the IT personnel to decode the signature); (ii) product owners that employ the FES technology, when providing service diagnostic information, would include any appropriate FES update directives in update packages. This will allow the IT personnel to better understand the execution environment; (iii) provide the capability to create a new (or obtain an existing) named functional exploitation signature (FES) that can be used in any manner by the requester; (iv) requester obtains FES during initialization, and begin turning on bits, bytes, strings, etc., that relate to specific functions during its processing; (v) FES management software hardens this data to a database; (vi) FES management software retrieves the previously used signature when the named FES is requested, in order to preserve prior execution information; and/or (vii) the collection of all of the FESes is used as a digital signature of the operating environment.

Some embodiments of the present invention may include one, or more, of the following features, characteristics and/or advantages: (i) enhancing decision making for applying updates and new functionality; (ii) when an update or new feature is created, FES update directives are included in the update package(s) that represent what functional areas are affected by the update; (iii) it may be important to understand whether all, part or none of the FES signature(s) are appropriate to provide an answer to the install-this question (for example, the FES update directives may require the need to mask a portion of the existing FES which may be for a prior version of the executing software); (iv) the ability to mask portions of a signature will be provided so that the update contains appropriate masking directives that can be applied by the Fix/Update Manager Program 510 when doing comparisons; (v) not making all maintenance serial by having a common part defining the components of the signature (for example, common macro, that would make all exploiting maintenance serial); (vi) it may be desirable for components to avoid shipping a single signature mapping, although this will be up to the individual exploiters; (vii) FES header includes name, version, system, processor serial number, subsystem names, etc.; (viii) the data in the FES includes bit strings, counters, text, and anything else deemed necessary by the exploiting components; and/or (ix) in fact, many systems could have the exact same signature if the exact same.

Some embodiments of the present invention may include one, or more, of the following features, characteristics and/or advantages: (i) understanding product usage; (ii) data can be collected in a call home fashion if client enables this feature; (iii) it can help the exploiting products better understand how their product is being used in their customer environments; (iv) understand what parts of products are being used; (v) understand what parts of products can be deprecated; (vi) understand what features in areas such as performance that aren't in use but probably should be; and/or (vii) client teams and advocates work with the client to exploit these important features (often today some entities do this in health checks but this can be expensive from a development perspective and can often consume client resources to perform the checks).

Some embodiments of the present invention may include one, or more, of the following features, characteristics and/or advantages: (i) proactive service analytics; (ii) when a problem is reported to an exploiting product's service team, the FES is collected (or portions of the FES related to the error); (iii) when the problem has been diagnosed and a bypass is known or a solution officially made available, the exploiting product's service team can search all of the known client's FES signatures for ones that may have matching signatures; (iv) with this information, the product owner can proactively target clients that may have the problem lying in wait to occur; (v) another aspect of this is to use the same FES for a reported problem and compare it to similar reported problems; and/or (vi) as new diagnostic material is submitted from clients, they materials could be programmatically checked to determine if it matches a previously reported problem.

Some embodiments of the present invention may include one, or more, of the following features, characteristics and/or advantages: (i) a system and method for improving serviceability in runtime wherein the individual Functional Exploitation Signatures (FES) are used to represent what functionality has been used on the system; (ii) the Fix/Update Manager Program 510 can use the FES signatures on the target systems and compare against the FES update directives supplied with update packages for the changes to be applied, in order to make the most effective installation determination; (iii) thus the collection of the FESes becomes a digital signature for the operating environment; (iv) this allows for making decisions regarding which updates are relevant to the particular environment and which updates are essential; (v) it also allows for a deeper analysis into product usage and proactive service analytics; (vi) using the FESes specific problem areas can be pinpointed and solutions can be applied to them before the actual problems occur; and/or (vii) a method of creating, modifying and accessing functional exploitation signature (FES) services.

Some embodiments of the present invention may include one, or more, of the following features, characteristics and/or advantages: (i) create signatures to identify functions being used and the updates being applied here represent entire replacements of the environment; and (ii) a method of creating, modifying and accessing functional exploitation signature (FES) services for the purpose of: (a) identifying functions being exploited by customers to allow them to selectively identify software updates that are appropriate to their environment, (b) allowing software service personnel for the products exploiting FES technology to understand what functions are being used in order to better understand the environment, (c) allow software service personnel to associate known problem with FES patterns in order to (1) more quickly identify duplicate errors and (2) proactively notify customers with matching FES patterns that they are exposed to known problems, (d) identify customers that are not exploiting certain functions, however would benefit from that, so that customer advocates may proactively educate customers on the new function and benefits to them of exploiting them, and (e) providing data to software developers on function usage in the field for the purpose of deprecating obsolete and no longer exploited function.

Although some embodiments of the present invention discuss identifying updates, it does so in order to allow a customer to more easily determine whether or not to apply a fix (i.e. an update), in an environment where availability is of such grave importance. Since some percentage of fixes for defects actually have defects themselves, and in some cases defects that are far worse and impact far more environments than the original fix, it would be advantageous to avoid applying fixes that have no benefit in this environment.

An example of functional exploitation data sets on a z/OS operating system may have an FES for the I/O Supervisor (IOS) component that includes: (i) zHPF I/O used; (ii) FICON I/O used; (iii) any external programming service used; (iv) parameters usage in external programming services (determining the purpose and type of requests); (v) services called in 24-bit execution mode; (vi) services called in 31-bit execution mode; (vii) services called in 64-bit execution mode; (viii) Disabled Interrupt Exit driven; (ix) Program Controlled Interrupt encountered; (x) MIDAWs used in a channel program; and (xi) IDAWs used in a channel program.

On a system, there can be many FES in use. Any product or product component could request the creation of a signature of any size. The FES, when created, provides useful information to the product owner. Therefore, the FES may contain product identifying information, such as, product name, release or service level information. This information could be encoded to conserve space. The FES is essentially self-describing, so it would also contain a length. For example, an input/output supervisor (IOS) component of a mainframe operating system, the FES could be 1024 bytes, while another component's FES could be 512 bytes. An example could be [FES info] [product/component identifying info] [level information] [execution signature data . . . ] The [FES info] could be a string 'FES' plus version and length information. The [product/component identifying info] for IOS may be [z/OS 5752SC1C3] or some other encoded form. The [level information] (format and length could be decided by the product/component) could be

[00000000 007E042F]. And finally, the [execution signature data] can be a series of bits, numbers, strings or anything necessary to be of value to the owner of the signature, such as [000FFFF01 00000000 7423B0AF . . . ]. Assume that the product/component owner of the execution signature data would develop a data structure to map this to meaningful information. The FES does not need to be fixed length. It may be fixed or variable in length, as required by the product.

Computer component model numbers and version numbers are additional examples of components of an FES. Using another example, an FES may include manufacturer, product ID, product version, maybe a feature code and then an indication as to whether or not the customer has enabled that feature. Then, someone doing failure analysis can determine if a needed feature was enabled. Or someone trying to determine what percentage of customer use a feature could combine the results from a large sample set to see that 76% of all customers have this feature enabled.

Figure 5:
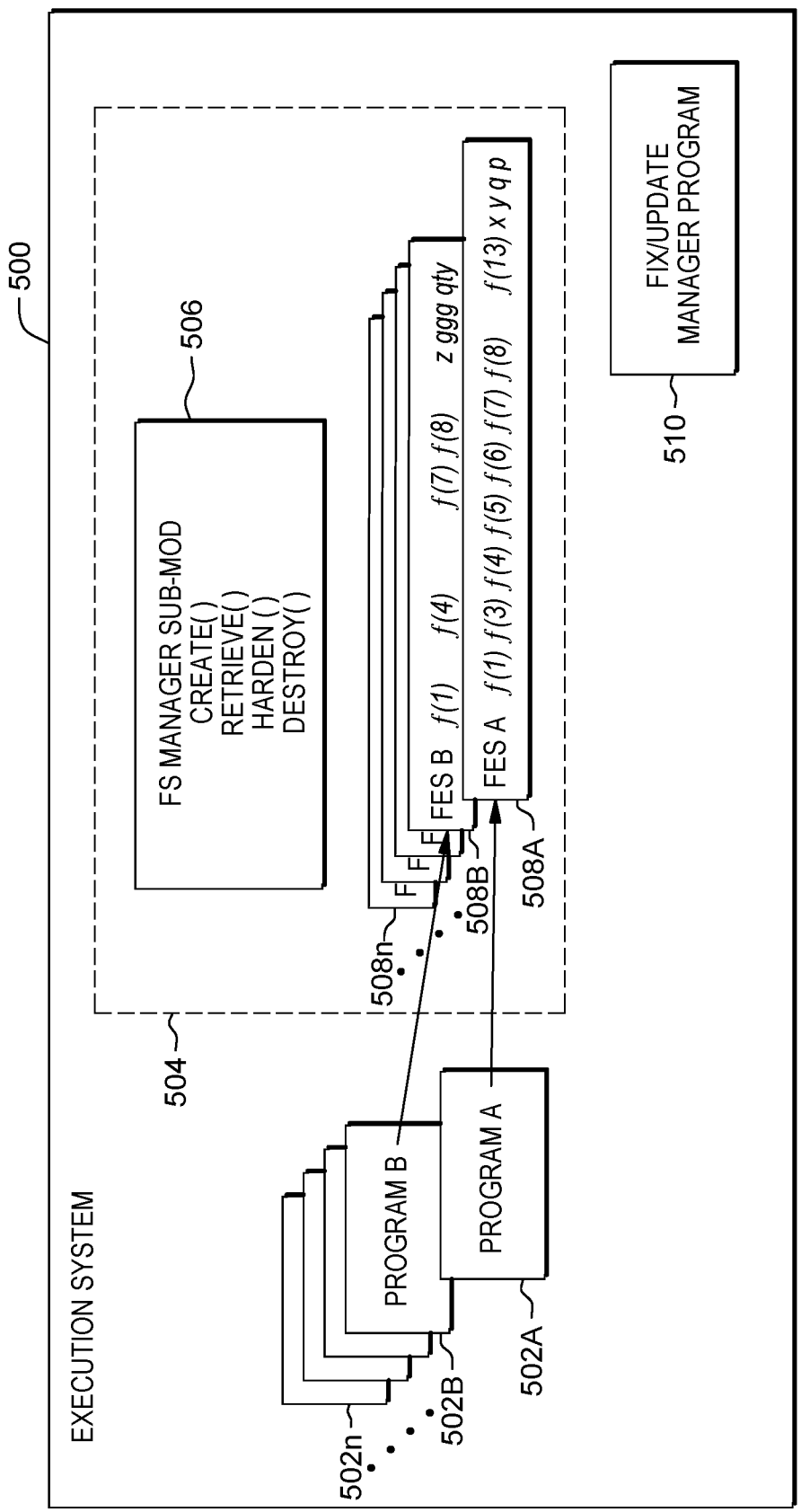
FIG. 5 is a block diagram view of an execution system according to a second embodiment of a system of the present invention.

An embodiment of a possible hardware and software environment for software and/or methods according to the present invention will now be described in detail with reference to the Figures. FIG. 5 is a functional block diagram illustrating various portions of execution system 500, including: Program(s) A through n 502*a* to 502*n*, FES manager program 504, FES manager sub-mod 506, FES(s) A through n 508A to 508*n*, and Fix/Update Manager Program 510.

In FIG. 5, Program(s) A, B . . . n can request that the FES Manager Program create a new FES for them if it is the first use of the FES, or it can ask the FES manager program to retrieve its previously created FES from the hardened database. When a FES is created for the first time, FES header data is supplied as parameters to the FES Manager Program FESCreate( ) method as well as the requested length of the FES. The FES is created in memory by the FES Manager Program, which includes this header data in the header portion of the FES. If the FESRetrieve( ) method is used, again header data is supplied as parameters, allowing the FES Manager Program to read the stored FES into memory. The FES Manager Program returns the address of memory assigned to the FES to the program which can then update its FES as the program executes as it deems necessary. Over a period of time, the FES for each program becomes a signature representing the parts of the programs that have been executed, as well as functions that have been used, and any data that is tracked has been recorded. Sample FES data is shown in FES A and FES B, for programs A and B respectively.

The FES Manager program can periodically write this data to a database or other non-volatile storage, or some other place where the data can be hardened. The FES Manager program may also include a FESHarden( ) method to allow Programs A, B . . . n to request that their specific FES be hardened on demand (the address of the FES would be a parameter). Also shown here is a Fix/Update Manager Program. It is likely that any system that runs programs has some method of applying fix/update packages. More will be described in later figures. An FESDestroy( ) method is also provided, allowing the programs to clear out any stored FES. This can be useful if a FES is retrieved, but determined to be a FES created by an older version of the owning program. A new FES could then be created for the new version of the program.

Figure 6A:
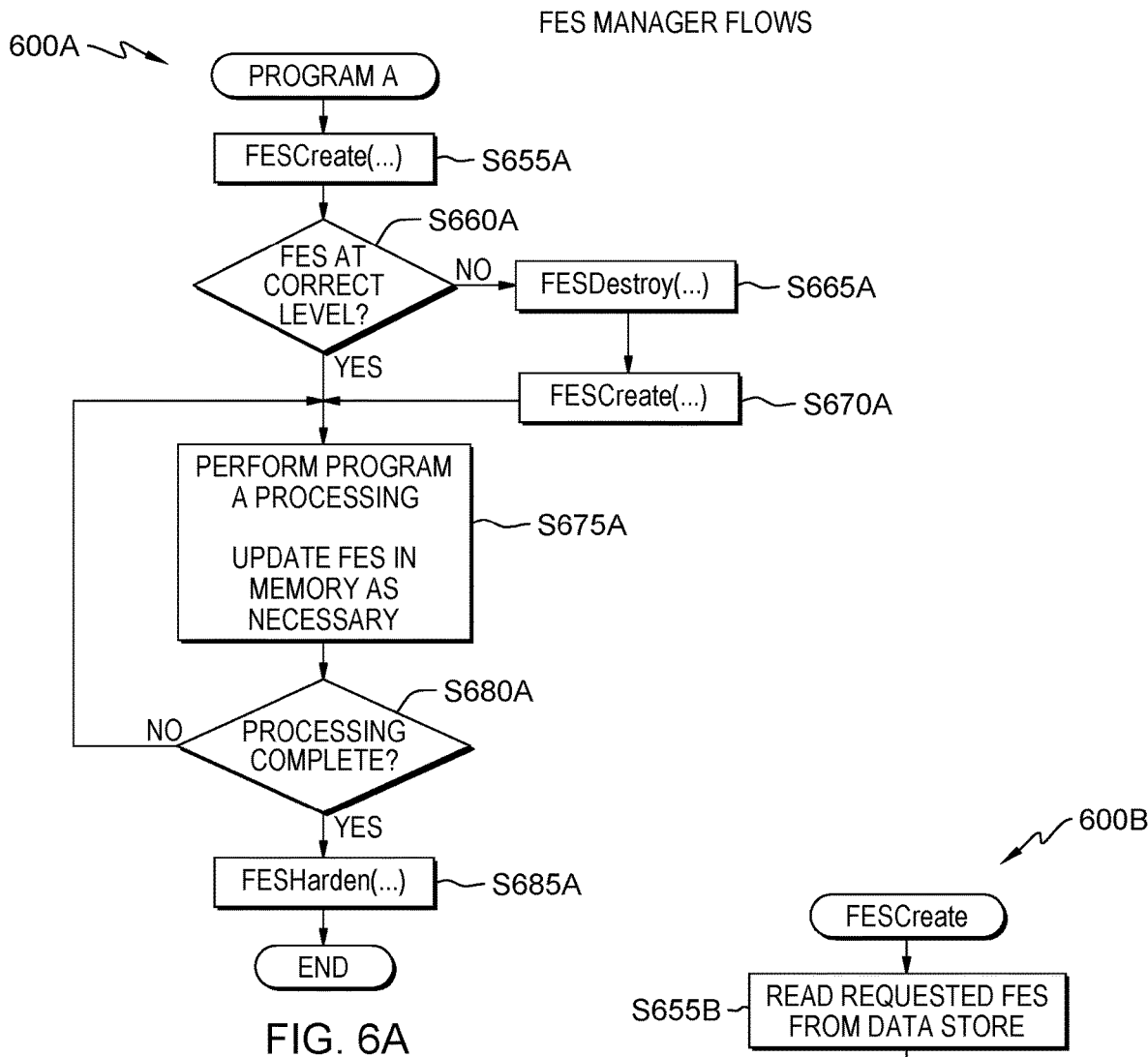
FIG. 6A is a flowchart showing a second embodiment method performed, at least in part, by the second embodiment system.

FIG. 6A is a flowchart diagram illustrating a method for a functional exploitation signature (FES)enabled program Program A 600A, including the following steps: (i) at S655A receive an FES for Program A from FESCreate( ) sub module; (ii) at S660A, determine if FES received at S655A is at the correct level; (iii) at S665A, responsive to determining that the FES is not at the correct level, perform FESDestroy( ) sub-module, destroying the FES; (iv) at S670A receive a new FES from FESCreate( ) sub-module and return to S660A; (v) at S675A, responsive to a determination that the FES is at the correct level, perform regular processing operations for Program A and update the FES as necessary; (vi) at S680A, run FESHarden( ) sub-module to harden the FES for Program A; and (vii) at S685A determine if processing for Program A is complete, returning to S675A if the determination is no and terminating functional exploitation manager software module 600A if the determination is yes.

Figure 6B:
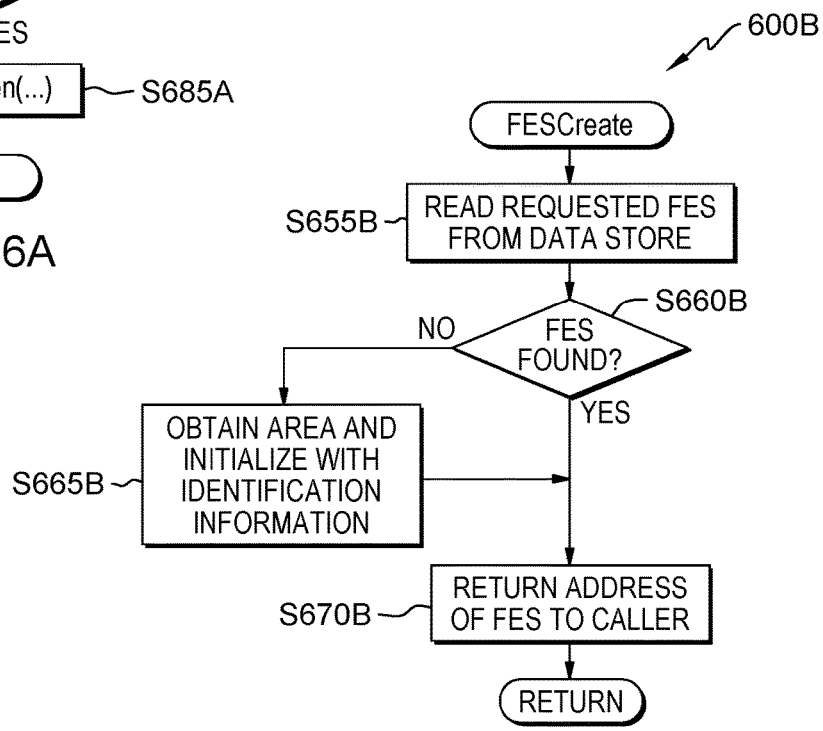
FIG. 6B is a flowchart showing a functional exploitation signature creation subroutine called by the second embodiment method performed, at least in part, by the second embodiment system.

FIG. 6B is a flowchart diagram illustrating a method for a functional exploitation creator sub-module 600B, including the following steps: (i) at S655B a requested FES is read from a data store; (ii) at S660B, determine whether the requested FES is found; (iii) at S665B, responsive to the determination that the requested FES is not found, obtain memory space in the data store for an FES and initialize an FES with identification information and return to S660B; and (iv) at S670B, responsive to the determination that an FES was found, return an address for the FES to a requesting software module.

Figure 6C:
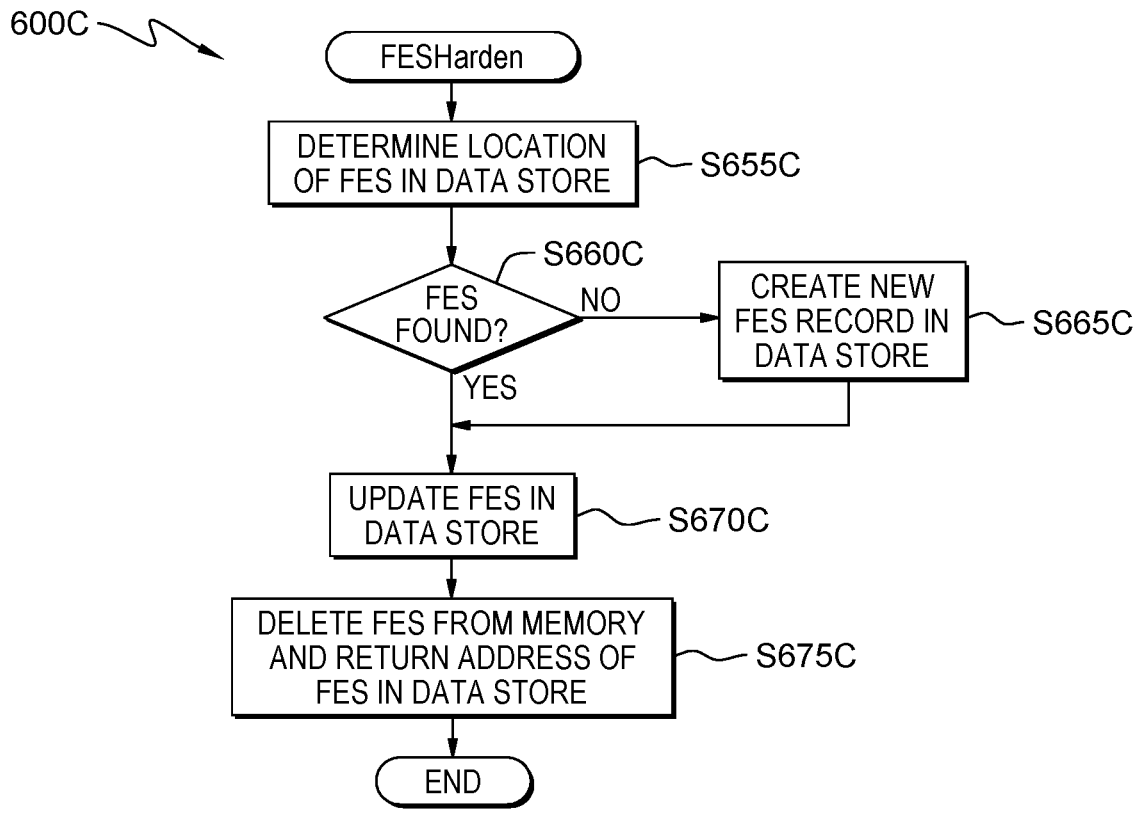
FIG. 6C is a flowchart showing a functional exploitation signature hardening subroutine called by the second embodiment method performed, at least in part, by the second embodiment system.

FIG. 6C is a flowchart diagram illustrating a method for a functional exploitation hardening sub-module 600C, including the following steps: (i) at S655C determine a location in a data store for an FES; (ii) at S660C determine if an FES is at the location; (iii) at S665C responsive to the determination that there is no FES at the location, create a new FES record in the data store at the location; (iv) responsive to the determination that an FES is at the location, harden the FES in the data store; and (v) delete the FES from memory and return an address to the location of the FES in the data store. In some alternative embodiments, FESHarden( ) does not delete the FES from memory, instead skipping step (v) above.

Figure 6D:
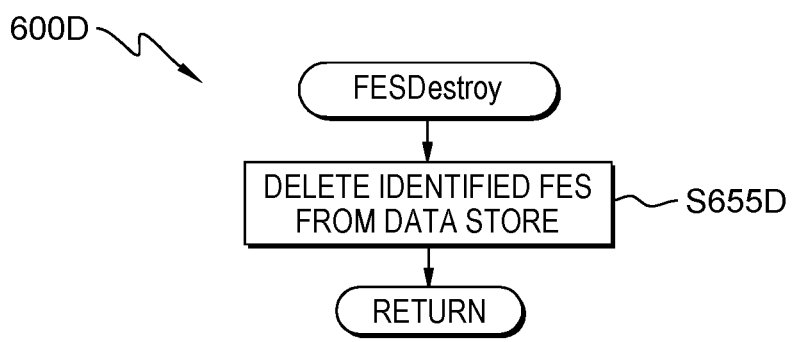
FIG. 6D is a flowchart showing a functional exploitation signature destroy subroutine called by the second embodiment method performed, at least in part, by the second embodiment system.

FIG. 6D is a flowchart diagram illustrating a method for a functional exploitation destroy sub-module 600D, including the following steps: at S655D delete an identified FES from a data store.

Figure 7:
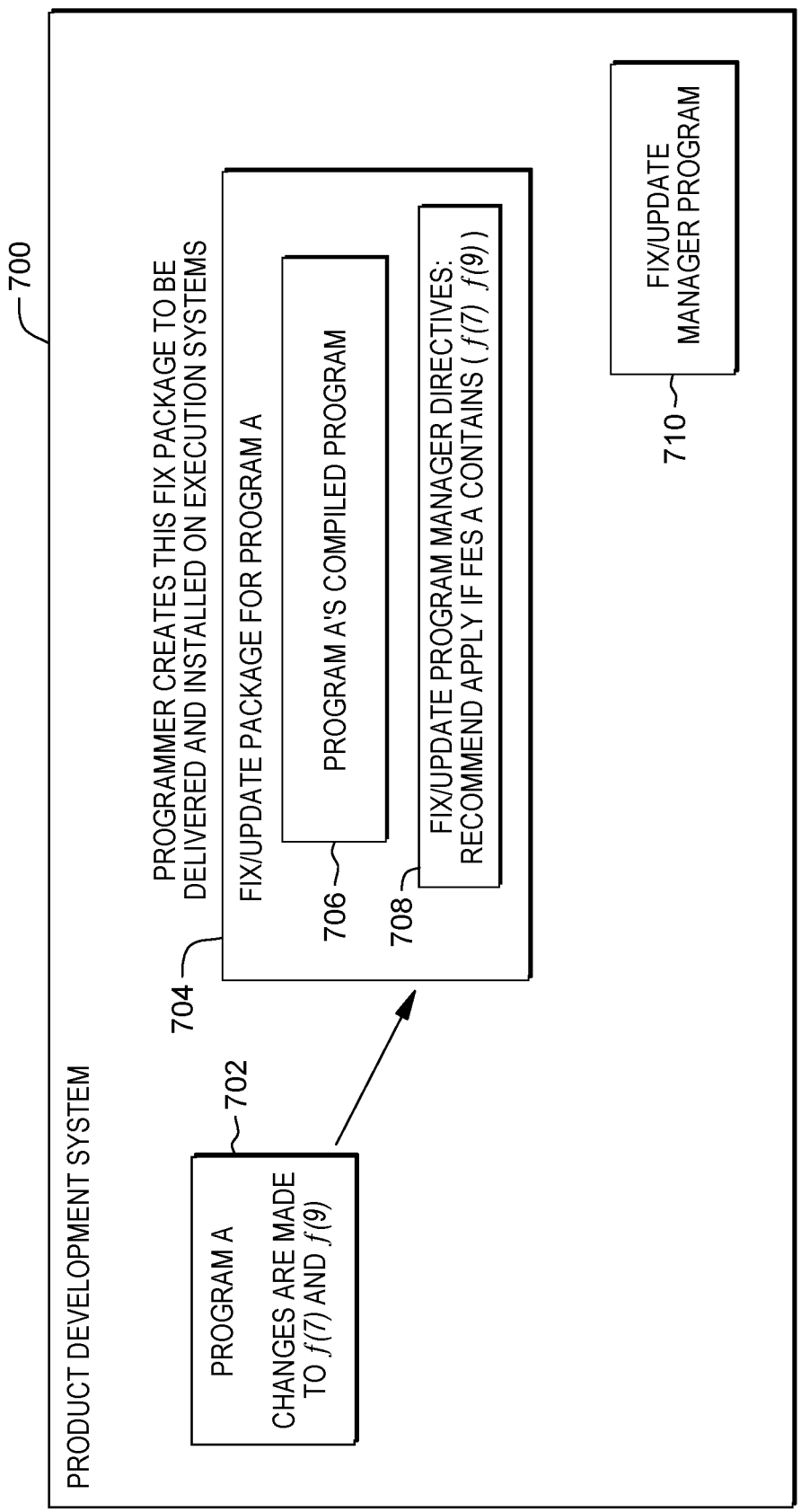
FIG. 7 is a block diagram view of a product development system according to a third embodiment of a system of the present invention.

FIG. 7 is a functional block diagram illustrating various portions of product development system 700, including: program Program A 702; fix/update package for Program A 704; Program A compiled fix/update code 706; fix/update program manager directives 708; and fix/update manager program 710.

On the product development system 700 in FIG. 7, a developer/programmer for Program A makes coding changes to the parts of the program that would have recorded f(7) and f(9) in the FES for Program A. The developer/programmer compiles and tests this program, and eventually creates an installable fix/update package that can be installed on the client's execution systems. In this embodiment, the developer/programmer also creates FES update directives for this program and includes it in the packaged fix/update. This fix/update package is consumed by the Fix/Update Manager Program.

Figure 8:
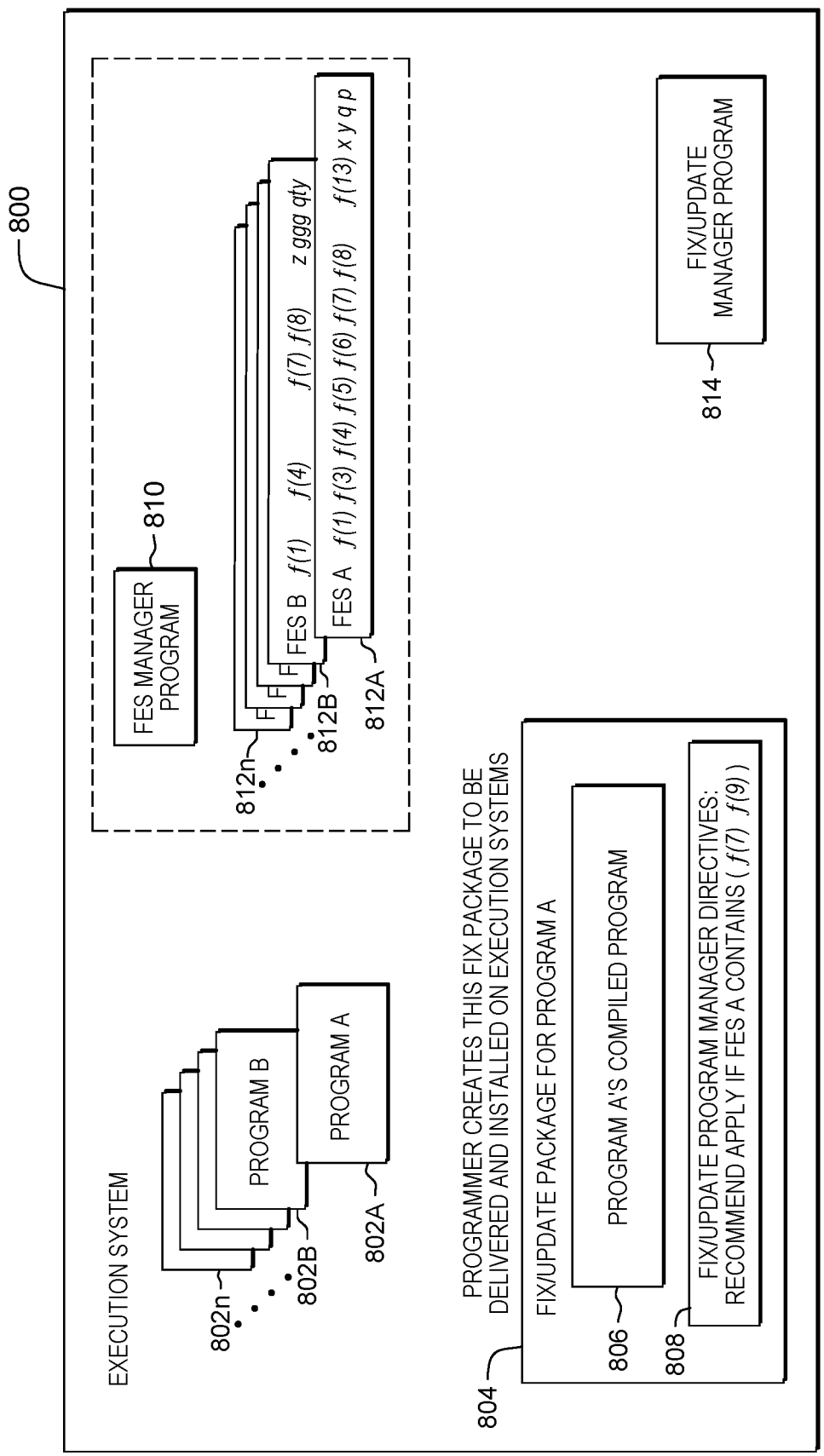
FIG. 8 is a block diagram view of an execution system according to the third embodiment of a system of the present invention.

FIG. 8 is a functional block diagram illustrating various portions of execution system 800, including: Programs A through Program n 802A to 802*n*; fix/update package for Program A 804; Program A's compiled fix/update code 806; fix/update program manager directives 808; FES manager program 810; FES A through FES n 812A to 812*n*; and fix/update manager program 814.

In FIG. 8, system programmers responsible for applying updates receive a Fix/Update Package for Program A from the Program A owner and run the Fix/Update Manager Program. The Fix/Update Manager Program sees the new FES update directive information included in the fix package. The Fix/Update Manager Program requests a copy of the FES for FES A from the FES Manager Program. If one is returned, information included in both FESes are compared to determine if the fix is required. In the example shown, f(7) is common to both, so the fix/update package is determined as important for this execution system. A second example could be that the FES update directives supplied in the fix package only identifies f(9) as affected by the fix/update package. Notice that the execution system's FES A shows that f(9) is not used, so the fix is determined to be unimportant based on the lack of commonality in the FES instances.

Figure 9A:
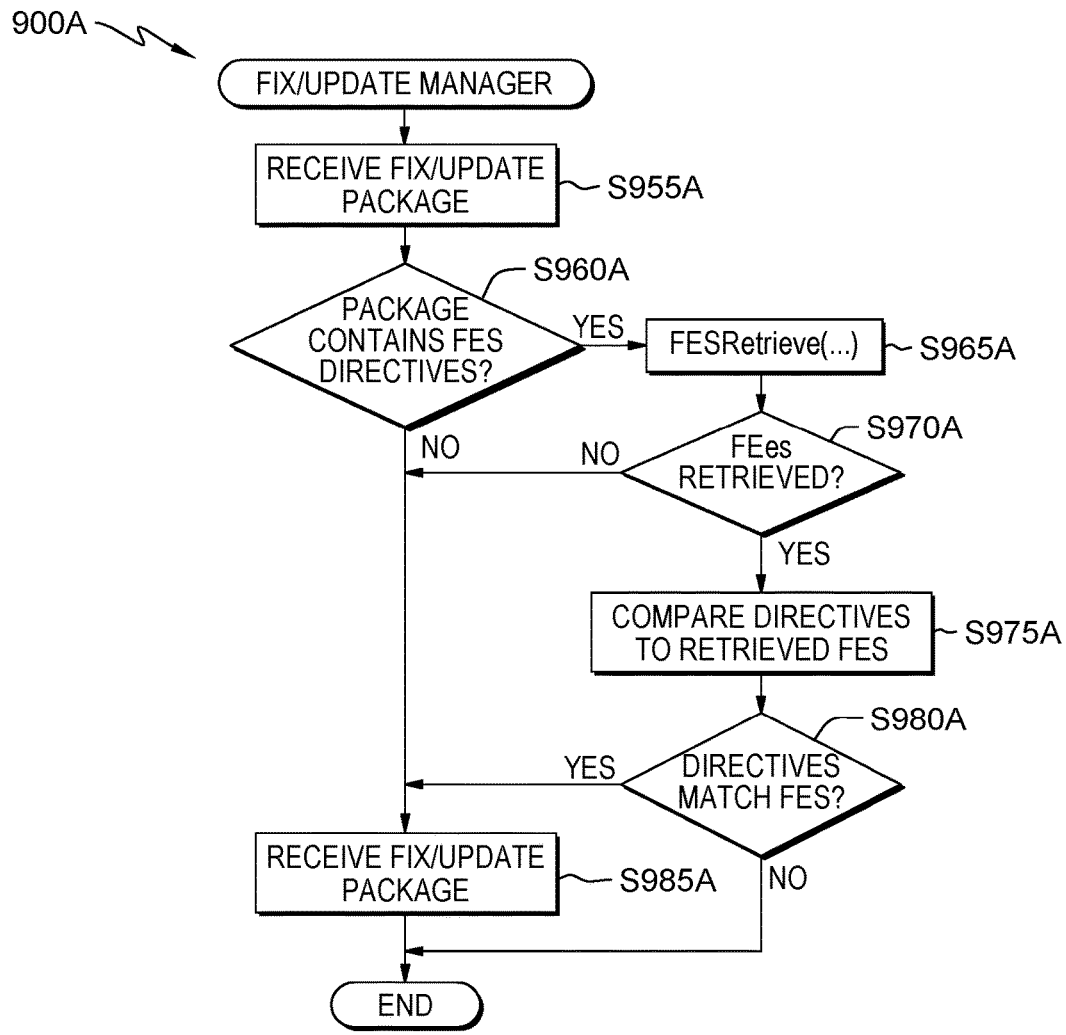
FIG. 9A is a flowchart showing a method for a fix/update manager according to an embodiment of the present invention.

FIG. 9A is a flowchart diagram illustrating a method for a functional exploitation enhanced fix/update manager software module 900A, including the following steps: (i) at S955A receive fix/update package; (ii) at S960A determine if the received package contains FES update directives and proceed to S985A if the determination determines the package has no FES update directives; (iii) at S965A responsive to a determination that the received package contains FES update directives, call FESRetrieve( ) sub-module; (iv) at S970A determine if FES(es) were retrieved and proceed to S985A if the determination determines that no FES(es) were retrieved; (v) at S975A, responsive to the determination that FES(es) were retrieved, compare FES update directives to retrieved FES; (vi) at S980A determine if FES update directives match the retrieved FES; (vii) at S985A, responsive to the determination that the FES update directives match the retrieved FES, apply the fix/update package; responsive to the determination that the FES update directives do not match the retrieved FES, the fix/update package is not applied.

Figure 9B:
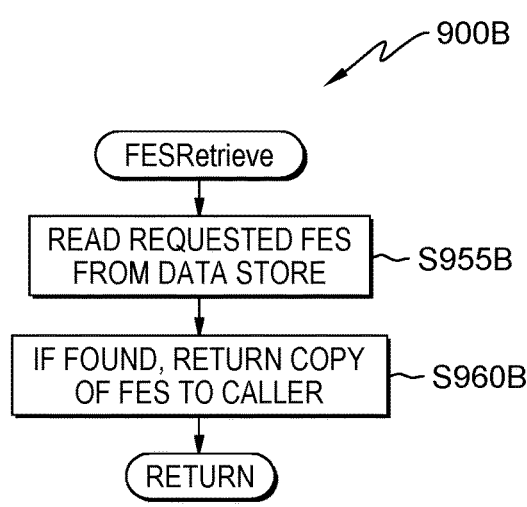
FIG. 9B is a flowchart showing a method for a functional exploitation retrieval subroutine method according to an embodiment of the present invention.

FIG. 9B is a flowchart diagram illustrating a method for a functional exploitation retrieve sub-module 900B, including: (i) at S955B read a requested FES from a data store; and (ii) at S960B return a copy of the requested FES to a caller.

Figure 10:
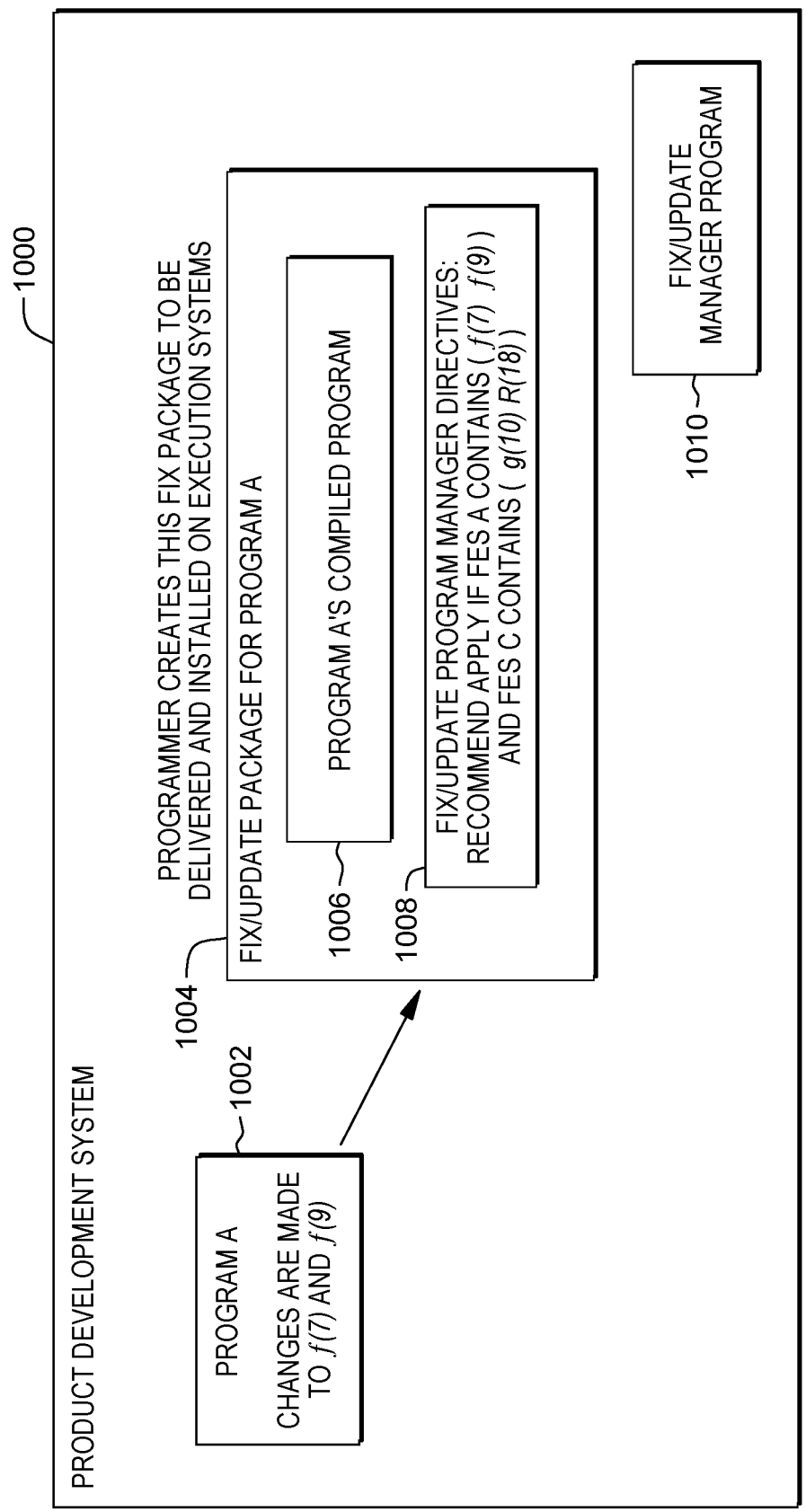
FIG. 10 is a block diagram showing a product development system according to the fourth embodiment of a system of the present invention.

FIG. 10 is a functional block diagram illustrating various portions of product development system 1000, including: a program Program A 1002; a fix/update package for Program A 1004; Program A compiled fix/update code 1006; fix/update program manager directives 1008; and fix/update program manager 1010.

In FIG. 10, some embodiments allow the developer of Program A to create a fix package that contains an FES MASK. The mask can be used to cause the Fix/Update Program to ignore certain portions of the data in the FES. The Fix/Update Manager Program would apply an AND operator to the MASK FES data with the FES A retrieved from the FES Manager Program. For example, an update could contain FES update directives that apply to more than one FES that has been recorded by an FES Manager. A program, Program C, may exist to record the presence of certain hardware features. An update in an update package 1008 may only be needed if an FES such as FES A has f(7) and f(9) indicated, and FES C indicates that hardware features represented by g(10) and R(18) are indicated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Software/firmware: software and/or firmware.

What is claimed is:

1. A computer-implemented method comprising:
receiving a plurality of functional exploitation data sets, including at least a first functional exploitation data set, where each functional exploitation data set includes information indicative of usage in an operating environment of a plurality of software, hardware and/or firmware components for a given computer system, and the first functional exploitation data set includes information indicative of usage in a first operating environment of a plurality of software, hardware and/or firmware components for a first computer system;
receiving a support request corresponding to the first computer system, including information indicative of one or more malfunctions occurring through usage of the first computer system in the first operating environment;
receiving a plurality of historical error data sets, where each historical error data set includes: (i) a historical functional exploitation data set including information indicative of usage in a historical operating environment of a plurality of software, hardware and/or firmware components for a given computer system of a plurality of computer systems, and (ii) information indicative of an error associated with a given software, hardware and/or firmware component of the given computer system;
selecting, by machine logic, an update procedure for determining whether to install and/or for installing a first software/firmware update on the first computer system based, at least in part, on comparing the received functional exploitation data set to the historical functional exploitation data sets of the plurality of historical error data sets;
sending, to the first computer system, a first software/firmware update data set according to the update procedure;
determining, from the plurality of historical error data sets, that a second historical error data set includes a historical functional exploitation data set indicative of usage in an operating environment of a plurality of software, hardware and/or firmware components similar to the components of the first computer system updated by the first software/firmware update; and
sending, to the second computer system, the first software/firmware update data set according to the update procedure;
wherein:
the functional exploitation data set is in the form of a functional exploitation signature (FES); and
the FES includes a header with the following fields: (i) name, (ii) version, (iii) system, (iv) processor serial number, and (v) subsystem names.

2. The method of claim 1 wherein:
the update procedure is automatic installation of the first software/firmware update; and
the first software/firmware update data set includes code for automatically making the first software/firmware update at the first computer system.

3. The method of claim 1 wherein:
the update procedure is discretionary installation of the first software/firmware update; and
the software/firmware first update data set includes code for inviting a user of the first computer system to decide whether to discretionarily make the first software/firmware update at the first computer system.

4. The method of claim 1 wherein the functional exploitation data set includes at least one of the following types of functional exploitation parameter values: (i) IBM System Z High Performance Fiber Connection Input/Output (zHPF I/O) used, (ii) Fiber Connection Input/Output (FICON I/O) used, (HEAD services called in 24-bit execution mode, (iv) services called in 31-bit execution mode, (v) services called in 64-bit execution mode, (vi) Disabled Interrupt Exit driven, (vii) Program Controlled Interrupt encountered, (viii) Modified Indirect Data Address Words (MIDAWs) used in a channel program, and/or (ix) Indirect Address List Word (IDAWs) used in a channel program.

5. The method of claim 1, further comprising:
executing regression testing on at least one software, hardware and/or firmware component based, at least in part, on the plurality of functional exploitation data sets.

6. A computer program product (CPP) comprising:
a non-transitory machine readable storage device; and
computer code stored on the non-transitory machine readable storage device, with the computer code including instructions for causing a processor(s) set to perform operations including the following:
receiving a plurality of functional exploitation data sets, including at least a first functional exploitation data set, where each functional exploitation data set includes information indicative of usage in an operating environment of a plurality of software, hardware and/or firmware components for a given computer system, and the first functional exploitation data set includes information indicative of usage in a first operating environment of a plurality of software, hardware and/or firmware components for a first computer system,
receiving a support request corresponding to the first computer system, including information indicative of one or more malfunctions occurring through usage in the first operating environment of the first computer system,
receiving a plurality of historical error data sets, where each historical error data set includes: (i) a historical functional exploitation data set including information indicative of usage in a historical operating environment of a plurality of software, hardware and/or firmware components for a given computer system of a plurality of computer systems, and (ii) information indicative of an error associated with a given software, hardware and/or firmware component of the given computer system,
selecting, by machine logic, an update procedure for determining whether to install and/or for installing a first software/firmware update on the first computer system based, at least in part, on comparing the received functional exploitation data set to the historical functional exploitation data sets of the plurality of historical error data sets, sending, to the first computer system, a first software/firmware update data set according to the update procedure, determining, from the plurality of historical error data sets, that a second historical error data set includes a historical functional exploitation data set indicative of usage in an operating environment of a plurality of software, hardware and/or firmware components similar to the components of the first computer system updated by the first software/firmware update, and sending, to the second computer system, the first software/firmware update data set according to the update procedure;

wherein:

the functional exploitation data set is in the form of a functional exploitation signature (FES); and the FES includes a header with the following fields: (i) name, (ii) version, (iii) system, (iv) processor serial number, and (v) subsystem names.

7. The CPP of claim 6 wherein:

the update procedure is automatic installation of the first software/firmware update; and the first software/firmware update data set includes code for automatically making the first software/firmware update at the first computer system.

8. The CPP of claim 6 wherein:

the update procedure is discretionary installation of the first software/firmware update; and the software/firmware first update data set includes code for inviting a user of the first computer system to decide whether to discretionarily make the first software/firmware update at the first computer system.

9. The CPP of claim 6 wherein the functional exploitation data set includes at least one of the following types of functional exploitation parameter values: (i) IBM System Z High Performance Fiber Connection Input/Output (zHPF I/O) used, (ii) Fiber Connection Input/Output (FICON I/O) used, (iii) services called in 24-bit execution mode, (iv) services called in 31-bit execution mode, (v) services called in 64-bit execution mode, (vi) Disabled Interrupt Exit driven, (vii) Program Controlled Interrupt encountered, (viii) Modified Indirect Data Address Words (MIDAWs) used in a channel program, and/or (ix) Indirect Address List Word (IDAWs) used in a channel program.

10. The CPP of claim 6, wherein the computer code further includes instructions for causing the processor(s) set to perform the following operations:

executing regression testing on at least one software, hardware and/or firmware component based, at least in part, on the plurality of functional exploitation data sets.

11. A computer system (CS) comprising:

a processor(s) set;

a machine readable storage device; and computer code stored on the machine readable storage device, with the computer code including instructions for causing the processor(s) set to perform operations including the following:

receiving a plurality of functional exploitation data sets, including at least a first functional exploitation data set, where each functional exploitation data set includes information indicative of usage in an operating environment of a plurality of software, hardware and/or firmware components for a given computer system, and the first functional exploitation data set includes information indicative of usage in a first operating environment of a plurality of software, hardware and/or firmware components for a first computer system, receiving a support request corresponding to the first computer system, including information indicative of one or more malfunctions occurring through usage in the first operating environment of the first computer system, receiving a plurality of historical error data sets, where each historical error data set includes: (i) a historical functional exploitation data set including information indicative of usage in a historical operating environment of a plurality of software, hardware and/or firmware components for a given computer system of a plurality of computer systems, and (ii) information indicative of an error associated with a given software, hardware and/or firmware component of the given computer system, selecting, by machine logic, an update procedure for determining whether to install and/or for installing a first software/firmware update on the first computer system based, at least in part, on comparing the received functional exploitation data set to the historical functional exploitation data sets of the plurality of historical error data sets, sending, to the first computer system, a first software/firmware update data set according to the update procedure, determining, from the plurality of historical error data sets, that a second historical error data set includes a historical functional exploitation data set indicative of usage in an operating environment of a plurality of software, hardware and/or firmware components similar to the components of the first computer system updated by the first software/firmware update, and sending, to the second computer system, the first software/firmware update data set according to the update procedure;

wherein:

the functional exploitation data set is in the form of a functional exploitation signature (FES); and the FES includes a header with the following fields: (i) name, (ii) version, (iii) system, (iv) processor serial number, and (v) subsystem names.

12. The CS of claim 11 wherein:

the update procedure is automatic installation of the first software/firmware update; and the first software/firmware update data set includes code for automatically making the first software/firmware update at the first computer system.

13. The CS of claim 11 wherein:

the update procedure is discretionary installation of the first software/firmware update; and the software/firmware first update data set includes code for inviting a user of the first computer system to decide whether to discretionarily make the first software/firmware update at the first computer system.

14. The CS of claim 12, wherein the functional exploitation data set includes at least one of the following types of functional exploitation parameter values: (i) IBM System Z High Performance Fiber Connection Input/Output (zHPF I/O) used, (ii) Fiber Connection Input/Output (FICON I/O) used, (iii) services called in 24-bit execution mode, (iv) services called in 31-bit execution mode, (v) services called in 64-bit execution mode, (vi) Disabled Interrupt Exit driven, (vii) Program Controlled Interrupt encountered, (viii) Modified Indirect Data Address Words (MIDAWs) used in a channel program, and/or (ix) Indirect Address List Word (IDAWs) used in a channel program.

15. The CS of claim 11, wherein the computer code further includes instructions for causing the processor(s) set to perform the following operations:
   executing regression testing on at least one software, hardware and/or firmware component based, at least in part, on the plurality of functional exploitation data sets.

* * * * *